United States Patent
Keutz et al.

(10) Patent No.: US 7,104,567 B2
(45) Date of Patent: Sep. 12, 2006

(54) GAS BAG MODULE

(75) Inventors: Markus Keutz, Rossdorf (DE);
Matthias Helmstetter, Aschaffenburg (DE); Marcus Magoley, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 331 days.

(21) Appl. No.: 10/743,678

(22) Filed: Dec. 22, 2003

(65) Prior Publication Data

US 2004/0135351 A1 Jul. 15, 2004

(30) Foreign Application Priority Data

Jan. 8, 2003 (DE) .......................... 203 00 170 U

(51) Int. Cl.
*B60R 21/20* (2006.01)

(52) U.S. Cl. ..................................... 280/728.3; 280/731

(58) Field of Classification Search ............. 280/728.3, 280/731, 736, 741, 728.2, 743.2
See application file for complete search history.

(56) References Cited

U.S. PATENT DOCUMENTS

| 5,125,682 | A | 6/1992 | Hensler et al. |
| 6,409,209 | B1 | 6/2002 | Amamori et al. |
| 2001/0052691 | A1 | 12/2001 | Bieber et al. |
| 2005/0093274 | A1* | 5/2005 | Frisch .................... 280/728.3 |

FOREIGN PATENT DOCUMENTS

| DE | 19904072 | 8/2000 |
| DE | 10036759 | 2/2002 |
| WO | 03/062023 | 7/2003 |

\* cited by examiner

*Primary Examiner*—David R. Dunn
*Assistant Examiner*—Drew J. Brown
(74) *Attorney, Agent, or Firm*—Tarolli, Sundheim, Covell & Tummino LLP

(57) ABSTRACT

A gas bag module includes a gas generator (10), a gas bag (28) in flow connection with the gas generator, and a module covering. The module covering covers the gas bag and has a separate central part (18) after opening of the module covering. The gas bag module further has a holding device (12) for the central part. The holding device has guide means (14, 16, 20, 22) which on inflation of the gas bag (28) permit a displacement of the central part (18) and delimit a displacement of the central part (18).

7 Claims, 4 Drawing Sheets

GAS BAG MODULE

TECHNICAL FIELD

The invention relates to a gas bag module.

BACKGROUND OF THE INVENTION

A conventional gas bag module normally has a gas generator, a gas bag and a module covering.

From DE 199 04 072 A1 there is known a gas bag module with a module covering and a ring-shaped gas bag, which is able to be inflated through an annular gap around the opened covering in a funnel shape in the direction towards the vehicle occupant. Only a slight movement of the entire module covering out from the module in the direction towards the occupant (unfolding direction) is permitted, this movement being so small that the occupant can not come into contact with the covering.

Through the invention, the final position of the module covering on unfolding of the gas bag is to be reliably established, the opening and the unfolding of the gas bag is to be improved and the gas bag is to assume a defined final position.

BRIEF SUMMARY OF THE INVENTION

According to the invention, a gas bag module includes a gas generator, a gas bag in flow connection with the gas generator, and a module covering. The module covering covers the gas bag and has a separate central part after opening of the module covering. The gas bag module further has a holding device for the central part. The holding device has guide means which on inflation of the gas bag permit a displacement of the central part and delimit a displacement of the central part. Through the gas bag module proposed, it is achieved that after opening of the module covering, only the now separate central part performs a movement towards the vehicle occupant, whereas the remaining parts of the module covering remain substantially stationary or are moved away from the vehicle occupant. Therefore, also for vehicle occupants who are in an OOP situation (OOP=out of position), the likelihood of being struck by a part of the module covering is distinctly reduced still further. If a gas bag section is secured under the central part and over the holding device, then on inflation of the gas bag the gas bag section can move the central part of the module covering as far as the guide means permit. Through the defined final position of the covering or of the central part, in addition the unfolding of the gas bag can be controlled such that even in an OOP situation, a reliable restraining effect is still able to be achieved.

On inflating of the gas bag, the central part of the module covering can be moved in an axial and in a radial direction in relation to the gas generator. In relation to the vehicle occupant, this means that the central part of the module covering can move both in the direction towards him and also in lateral direction to him, so that as a result a lateral shifting of the central part occurs with respect to the occupant.

According to an embodiment of the invention, the guide means comprise at least one pin element connected with the central part. The guide means have in addition a sleeve element which cooperates with the pin element such that the central part is moved substantially in axial direction in relation to the gas generator. This means that the pin element is guided so closely in the sleeve element matching therewith, that practically no lateral movement of the pin element can take place, for which reason also the central part of the module covering does not undergo any lateral movement. It is advantageous that the pin element and the sleeve element matching therewith represent a particularly simple and favorably priced connection between holding device and central part.

A further embodiment makes provision that the pin element has a pin end section which can cooperate with the sleeve element such that the movement of the central part is limited. This represents a form of limitation of the movement of the central part which is particularly simple to produce and is favorably priced.

Particularly advantageous is an embodiment in which the holding device has deformation means configured as plastically deformable components. Such deformation means can bring about both the movement of the central part of the module covering and also delimit this effectively.

In further embodiments, the deformation means can be deformed either under mechanical action or under mechanical and thermal action. It is therefore possible to design deformation means depending on the type of the gas generator with regard to the increasing gas pressure or to the increasing temperature of the combustion products from the gas generator.

In a particular development, the deformation means is a spacer element.

The holding device can also have a first slope surface and the central part a second slope surface, the first and second slope surfaces cooperating with each other such that on inflation of the gas bag, the central part is moved in axial direction and in radial direction in relation to the gas generator. In other words, this means that the first and second slope surfaces are constructed as planes which can slide one on the other, whereby the action of force of the gas bag section forces a movement of the central part of the module covering in relation to the holding device, which runs both towards the vehicle occupant and also in lateral direction to him. This is a particularly simple way to realize, simultaneously with the movement of the central part of the module covering towards the vehicle occupant, a lateral shifting movement with respect thereto.

The central part is preferably constructed such that it bears a vehicle emblem. In this case, the detaching of the emblem from the central part of the covering is reliably prevented owing to the movement limitation and the risk of injury to the vehicle occupant is distinctly reduced.

DETAILED DESCRIPTION OF THE PREFERRED EMBODIMENTS

Figure 1A:
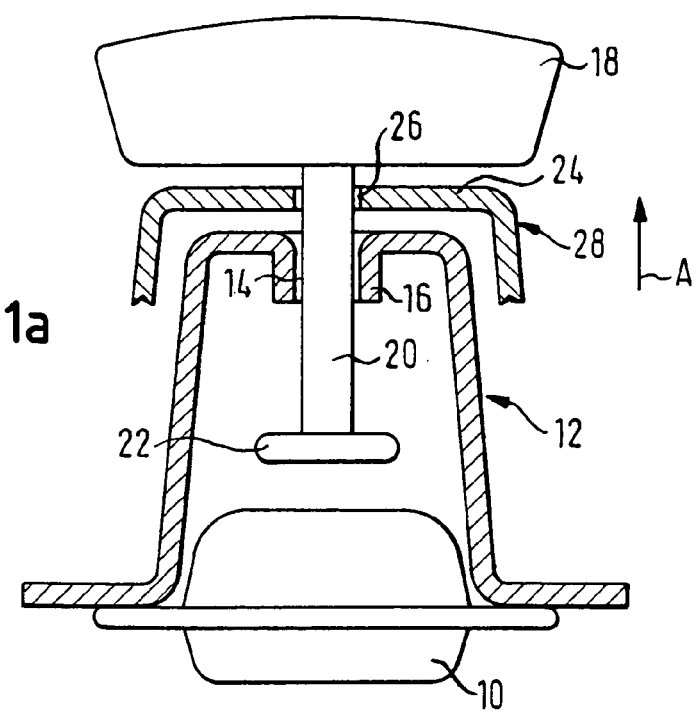
FIGS. 1a and 1b show a first embodiment of the gas bag module according to the invention in the region of the holding device.

In FIG. 1 a detail of a gas bag module is illustrated, which is housed in a vehicle steering wheel which is not illustrated. The gas bag module has a gas generator 10, on which a holding device 12, which is constructed substantially in a cup shape, is arranged. At the end of the holding device 12 facing away from the gas generator 10, there is an opening 14 onto which a sleeve element 16 is formed on in one piece with the holding device 12, the sleeve element extending from the opening in the direction towards the gas generator. In addition, a separate central part 18 is shown of a module covering (not illustrated further). In the operating state, the central part can be formed in a conventional manner onto the remaining module covering, with the formation of a predetermined tear line. The central part 18 is securely connected with a pin element 20, the pin element lying on the side of the central part of the module covering facing the gas generator and projecting through the sleeve element 16 into the holding device 12. At the end of the pin element 20 facing the gas generator, there is a disc-shaped pin end section 22, the external diameter of which is greater than the external diameter of the sleeve element. The opening 14, sleeve element 16 and pin element 20 with the pin end section 22 serve as guide means. Between the holding device 12 and the central part 18 of the module covering there is a section 24 of a gas bag 28. In the region of the section 24, the gas bag 28 has a gas bag opening 26, through which the pin element 20 is passed and thus fixes the gas bag section in relation to the gas generator 10 in lateral direction.

Figure 1B:
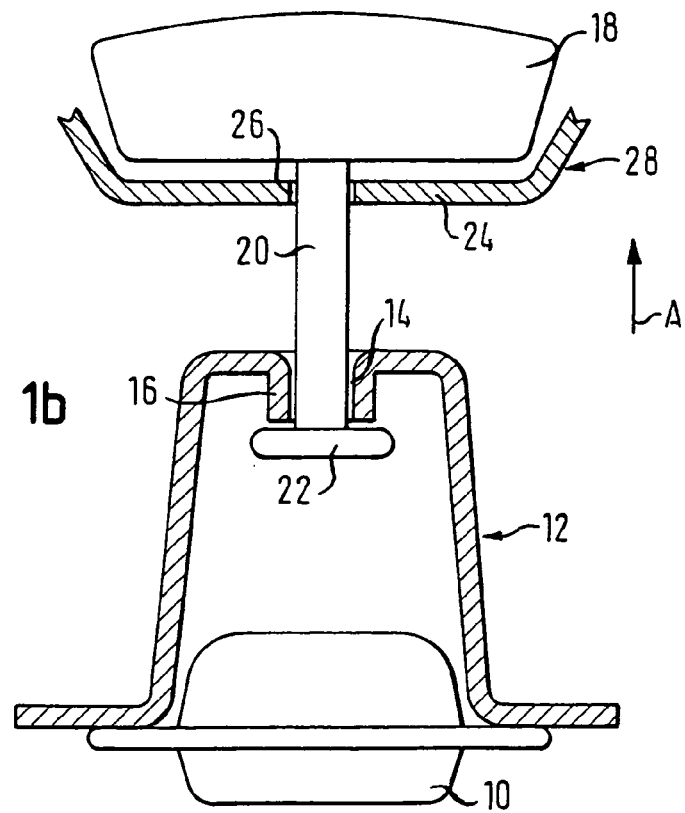

In FIG. 1a the state of rest with a non-activated gas bag is illustrated, in which the central part 18 lies against the gas bag section 24 such that it presses it against the holding device 12. FIG. 1b shows the gas bag module with inflated gas bag with the central part 18 of the module covering spaced apart from the holding device.

As soon as an accident is detected, gas flows out from the gas generator 10 into the initially folded gas bag 28 and begins to inflate it. On opening of the module covering, the central part 18 is separated from the remaining parts of the module covering and is moved from the gas bag 28 in the region of the gas bag section 24 in an axial direction A away from the gas generator 10. In other words, this means that the central part 18 is moved here towards the vehicle occupant. Through the guiding of the pin element 20 in the sleeve element 16, it is ensured that the central part 18 can not swerve laterally. When the pin end section 22 reaches the lower end of the sleeve element 16, the movement of the central part 18 towards the vehicle occupant is stopped. The cross-sectional shape of pin element 20 and sleeve element 16 can be, according to requirements, cylindrical, shaped like a parallelepiped, conical or constructed as any other suitable profile.

Figure 2A:
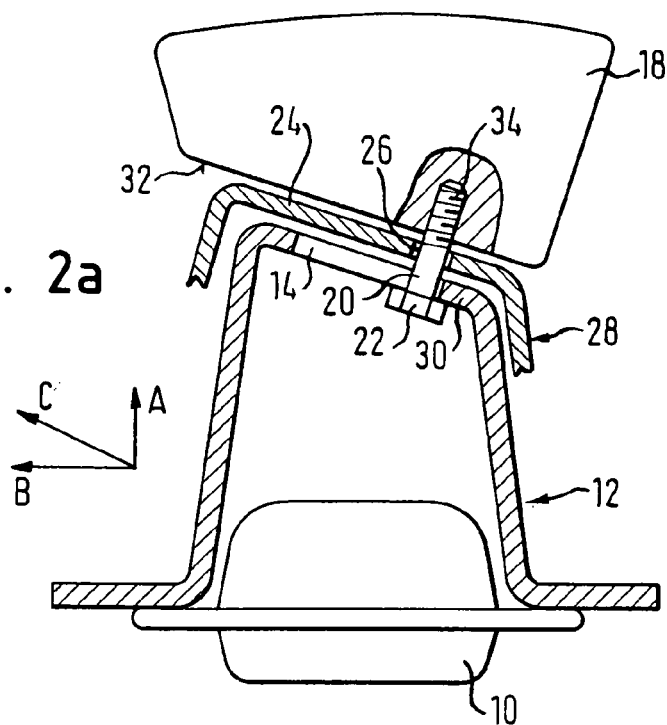
FIGS. 2a and 2b show a second embodiment of the gas bag module according to the invention in the region of the holding device.
Figure 2B:
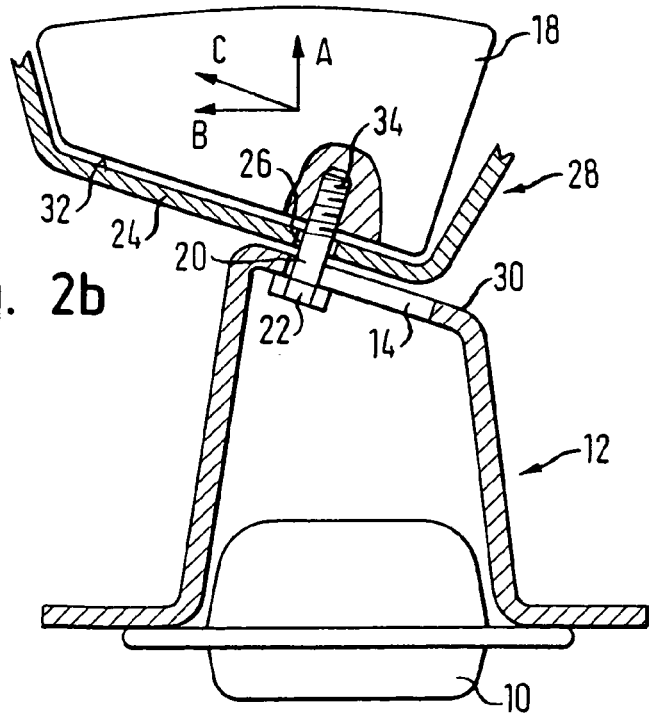

In FIGS. 2a and 2b a second embodiment of the gas bag module according to the invention is illustrated. The gas generator 10 is connected with the holding device 12. The holding device is again constructed so as to be cup-shaped, however here it has a first slope surface 30 at the end facing away from the gas generator. In the first slope surface 30, the opening 14 is situated, which in this embodiment is constructed as an oblong hole or slit. The central part 18 of the module covering has a second slope surface 32, which runs parallel to the first slope surface 30 of the holding device 12. On the central part 18, the pin element 20 is fixed, the connection between pin element and central part takes place by means of a threaded section 34. The pin element 20 has the pin end section 22. Through the cooperation of the disc-shaped pin end section 22 with the opening 14, it is achieved that the first slope surface 30 and the second slope surface 32 always have a constant distance from each other. This is dimensioned such that the gas bag section 24 lying between the first slope surface 30 and the second slope surface 32 lies well both against the central part 18 of the module covering and also against the first slope surface. The gas bag section 24 has the gas bag opening 26, through which the pin element 20 passes, whereby the gas bag 28 is fixed with respect to the central part 18 of the module covering in lateral direction.

FIG. 2a shows the initial state with non-activated gas bag 28, FIG. 2b shows the final state with inflated gas bag, with the central part 18 of the module covering displaced towards the vehicle occupant in direction A and laterally in direction B.

If the gas generator is ignited, then the initially folded gas bag 28 is inflated and exerts onto the central part 18, which has been detached from the remaining parts of the module covering on opening of the module covering, such a force that the central part 18 moves parallel to the slope surfaces 30, 32 in arrow direction C. The opening 14, constructed as an oblong hole or slit, the pin element 20 and the pin end section 22 act here as guide means which control the movement of the central part of the module covering. The movement of the central part 18 is delimited by the stop of the pin element 20 on a longitudinal end of the opening 14. From the view of the vehicle occupant, the central part 18 moves in a first movement component both in direction A frontally towards him and also in a second movement component in direction B laterally away from him.

Figure 3A:
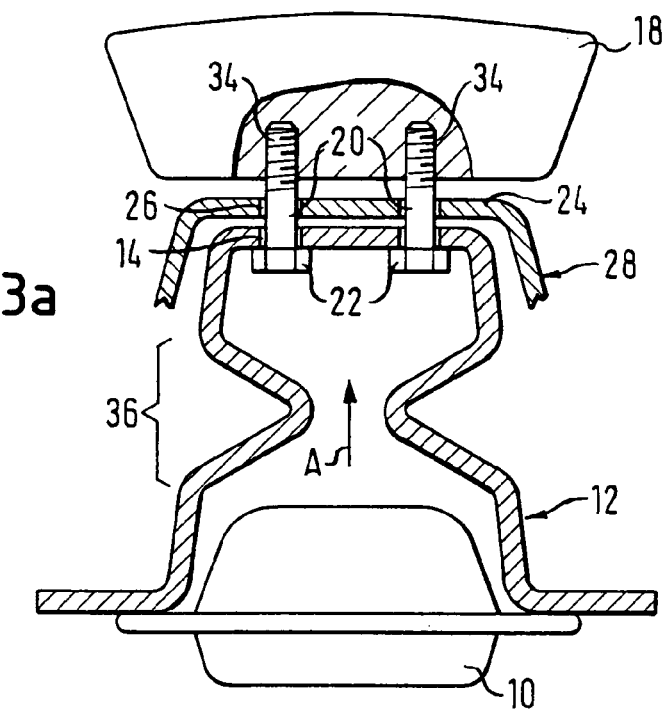
FIGS. 3a and 3b show a third embodiment of the gas bag module according to the invention in the region of the holding device.
Figure 3B:
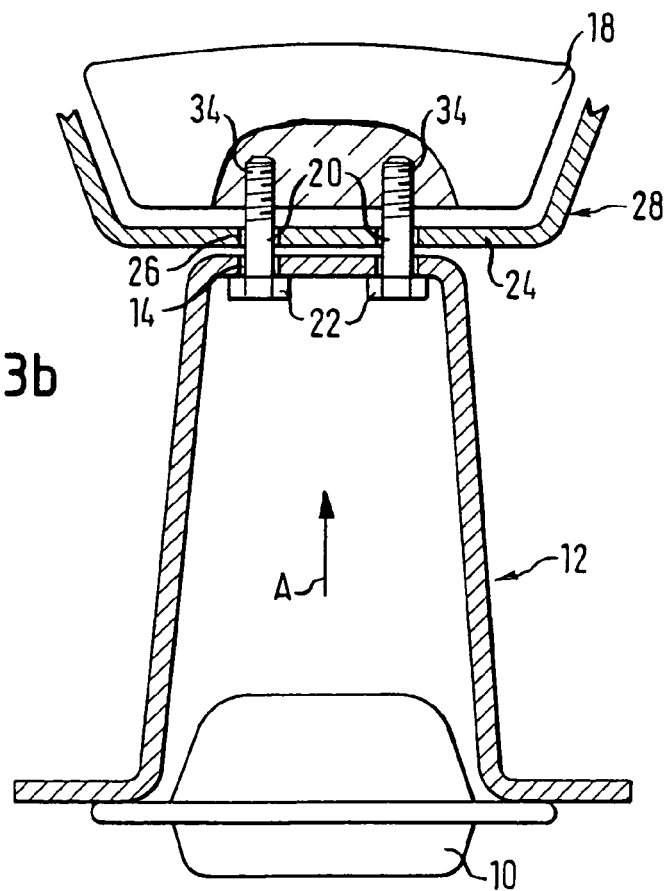

In a third embodiment of the invention illustrated in FIGS. 3a and 3b, the holding device 12 is fastened to the gas generator 10 or to a generator carrier (not illustrated), the holding device having amongst the openings 14 a deformation means 36, which is constructed as a compression zone in the otherwise smooth-walled region of the holding device between gas generator and gas bag section 24. The central part 18 of the gas bag covering is securely connected by means of the threaded sections 34 with pin elements 20 (two here). The pin elements 20 have pin end sections 22 by which the central part 18 is fixed in the holding device 12. Between the holding device 12 and the central part 18, the gas bag section 24 of the gas bag 28 is situated, the gas bag section having two (or more) gas bag openings 26, through which the pin elements 20 pass, in order to fix the gas bag section in lateral direction.

FIG. 3a shows the gas bag 28 in the state of rest. On triggering of the gas generator 18, the gas bag 28 is inflated. The gas bag section 24 exerts a force here in direction A onto the central part 18 of the module covering and therefore also onto the holding device 12 which is securely connected therewith, whereby the initially compressed deformation means 36 is drawn apart under plastic deformation. This is achieved either solely by mechanical forces, i.e. the pressure forces from the expanding gas, or by the additional action of thermal energy, i.e. the hot reaction products from the gas generator. The deformation means 36 is extended in direction A, the displacement of the central part 18 of the module covering being delimited by the maximum compression of the deformation means 36 before the activation of the gas generator.

Figure 4A:
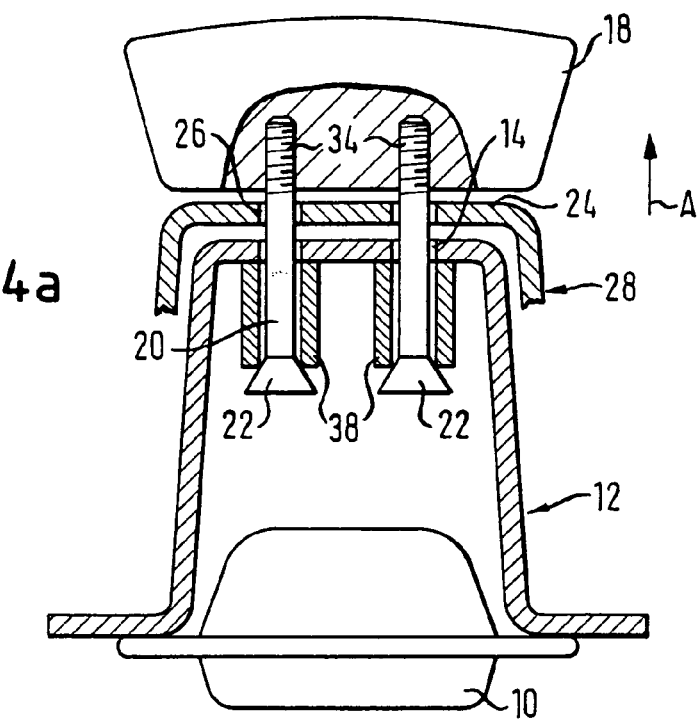
FIG. 4 shows a fourth embodiment of the gas bag module according to the invention, in the region of the holding device.
Figure 4B:
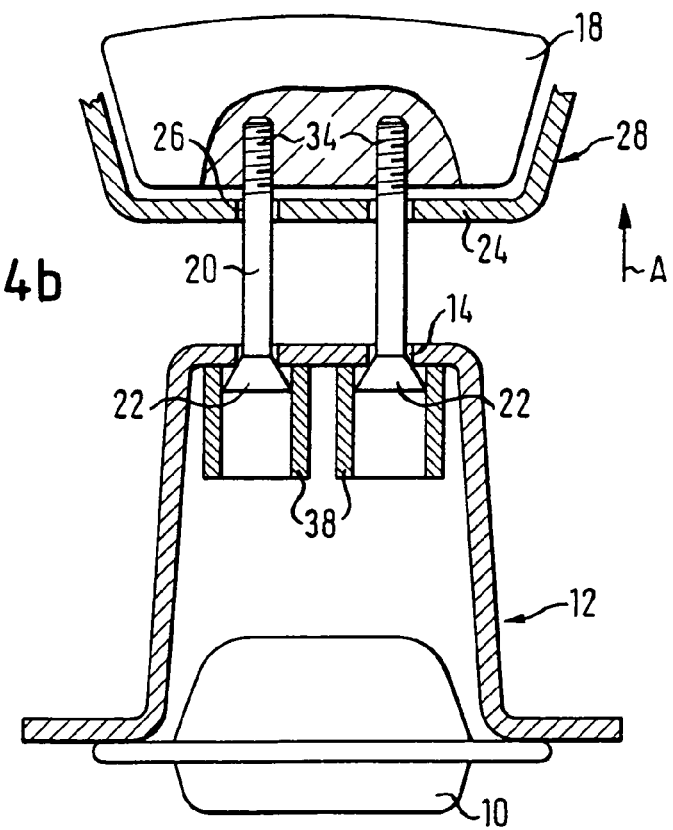

In a fourth embodiment of a detail of the gas bag module illustrated in FIGS. 4a and 4b, the cup-shaped holding device 12 having openings 14 is fastened to the gas generator 10. At the openings 14, spacer elements 38 acting as deformation means are arranged such that they extend in the direction towards the gas generator 10. The central part 18 of the module covering is connected by means of threaded sections 34 with pin elements 20 which have pin end sections 22 at the end facing the gas generator 10. The pin end sections 22 are cone-shaped in this embodiment, the cone widening towards the gas generator 10 and the maximum diameter of the pin end section being approximately equal to the external diameter of the spacer element. Between the holding device 12 and the central part 18, the gas bag section 24 is arranged and has openings 26, through which pin elements 20 pass and thus fix the gas bag in lateral direction.

In the position of rest shown in FIG. 4*a*, the central part 18 lies substantially against the gas bag section 24 and the holding device 12. The conical pin end sections 22 still project out from the spacer elements 38. If the gas generator is ignited and the previously folded gas bag 28 is inflated, then the gas bag section 24 exerts a force in direction A onto the central part 18. The central part 18 here takes with it the pin elements 20 and the pin end sections 22, whereby the pin end sections 22 permanently deform the spacer elements 38 by widening. When the pin end sections 22 strike against the base region of the holding device 12 facing away from the gas generator 10, the movement of the central part 18 of the module covering is stopped. The final state which is now reached with the gas bag inflated is illustrated in FIG. 2*b*. The deformation of the spacer elements 38 can take place both solely owing to mechanical forces and also through the combination of mechanical and thermal action on the spacer elements on releasing of the gases from the gas generator.

The invention claimed is:

1. A gas bag module comprising a gas generator (10), a gas bag (28) in flow connection with said gas generator, a module covering which covers said gas bag and has a separate central part (18) after opening of said module covering, and a holding device (12) for said central part, said holding device having guide means (14, 16, 20, 22) which on inflation of said gas bag (28) permit a displacement of said central part (18) and delimit a displacement of said central part (18), and wherein said holding device includes a plastically deformable spacer element (38) which is permanently deformed upon a movement of said central part (18) as a result of an activation of said gas generator (10).

2. The gas bag module according to claim 1, characterized in that under said central part (18) and over said holding device (12) a gas bag section (24) is secured.

3. The gas bag module according to claim 1, characterized in that said guide means are formed such that on inflation of said gas bag (28), said central part (18) is displaced in a substantially axial direction (A) in relation to said gas generator (10).

4. The gas bag module according to claim 3, characterized in that said guide means have at least one pin element (20) connected with said central part (18).

5. The gas bag module according to claim 1, characterized in that said spacer element (38) is deformed under mechanical action.

6. The gas bag module according to claim 1, characterized in that said spacer element (38) is deformed under thermal action.

7. The gas bag module according to claim 1, characterized in that said central part (18) bears an emblem.

* * * * *